(12) United States Patent
Leighton et al.

(10) Patent No.: US 7,549,938 B2
(45) Date of Patent: Jun. 23, 2009

(54) TREADMILL BELT

(75) Inventors: Jay Philip Leighton, Charlotte, NC (US); Sandra Vause Canipe, Harrisburg, NC (US)

(73) Assignee: Forbo Financial Services AG (CH)

( * ) Notice: Subject to any disclaimer, the term of this patent is extended or adjusted under 35 U.S.C. 154(b) by 1117 days.

(21) Appl. No.: 10/337,706

(22) Filed: Jan. 7, 2003

(65) Prior Publication Data

US 2004/0132587 A1 Jul. 8, 2004

(51) Int. Cl.
*F16G 1/04* (2006.01)

(52) U.S. Cl. ...................................... 474/268

(58) Field of Classification Search ................ 474/268; 482/54; 198/850, 853
See application file for complete search history.

(56) References Cited

U.S. PATENT DOCUMENTS

| | | | |
|---|---|---|---|
| 722,041 A | 3/1903 | Plummer | |
| 770,063 A | 9/1904 | Gingras | |
| 1,116,237 A | 11/1914 | Burrell | |
| 1,165,780 A | 12/1915 | Jappe | |
| 1,637,475 A | 8/1927 | Davis et al. | |
| 2,621,159 A | 12/1952 | Perry et al. | |
| 2,640,366 A | 6/1953 | Knuth | |
| 2,800,701 A | 7/1957 | Watts et al. | |
| 2,983,304 A | 5/1961 | Rasero | |
| 3,297,514 A | 1/1967 | Poeschl et al. | |
| 3,509,006 A | 4/1970 | Baxendale et al. | |
| 3,639,316 A | 2/1972 | Argiro | |
| 3,659,845 A | 5/1972 | Quinton | |
| 4,109,543 A | 8/1978 | Foti | |
| 4,407,333 A | 10/1983 | Fowkes | |
| 4,526,637 A | 7/1985 | Long | |
| 4,534,750 A * | 8/1985 | Okumoto | 474/261 |
| 4,826,472 A | 5/1989 | Sato et al. | |
| 4,872,664 A * | 10/1989 | Parker | 482/54 |
| 4,877,126 A | 10/1989 | Van Calker et al. | |
| 5,383,828 A | 1/1995 | Sands et al. | |
| 5,529,545 A | 6/1996 | Isshiki et al. | |
| 5,677,367 A * | 10/1997 | Savin | 523/219 |
| 5,705,446 A | 1/1998 | Fujishiro et al. | |
| 5,785,621 A | 7/1998 | Birzele | |
| 5,907,014 A | 5/1999 | Quint | |
| 5,951,441 A | 9/1999 | Dalebout et al. | |
| 6,245,722 B1 * | 6/2001 | Maples et al. | 508/208 |
| 6,569,816 B2 * | 5/2003 | Oohira et al. | 508/107 |

* cited by examiner

*Primary Examiner*—Vicky A Johnson
(74) *Attorney, Agent, or Firm*—Michael G. Johnston; Moore & Van Allen PLLC

(57) ABSTRACT

An endless treadmill belt includes a bottom-ply fabric that at least partially forms a bottom surface of the belt, and the bottom surface of the belt is for sliding across a treadmill deck. The bottom-ply fabric includes textured synthetic yarns that at least partially form the bottom surface of the belt. A solid lubricant composition is impregnated in the bottom-ply fabric. The solid lubricant composition is a mixture that includes higher and lower viscosity lubricants and a binder.

26 Claims, 4 Drawing Sheets

TREADMILL BELT

BACKGROUND OF THE INVENTION

The present inventions relate to belts and belt lubricants, and more particularly to lubricated, endless belts for treadmills.

Treadmills used for exercise are well known and very popular. A prior art exercise treadmill typically includes an endless belt that is driven by a motor so that the bottom surface of an upper run of the belt slides across an upper surface of a stationary deck. In use, a person using the treadmill engages the top surface of the upper run of the belt at a position above the deck, which contributes to friction between the bottom surface of the upper run and the upper surface of the deck. Over the years, efforts have been made to reduce this friction, in an effort to reduce: the power required to drive the belt, friction-induced heating, and friction-induced noise. Reducing the friction can enhance the operation and life of the belt. It is known to reduce the friction between treadmill belts and decks through the use of lubrication, and there are several known lubricants and associated methods.

It is prior art to apply a lubricant, such as a lubricant consisting of polypropylene wax, a polyurethane binder and solvent, to rolls of belt material before forming endless belts (e.g., "light duty" belts, which are discussed below in this Background section) from the belt material. Then, the solvent is driven off by heating, so that the resultant lubricant is impregnated in the belt material and is substantially in solid form at room temperature. Thereafter, sections are cut from the belt material and joined (e.g., spliced) end-to-end to form the endless belts that are used as treadmill belts. Although the foregoing method of lubricating is very efficient in some regards, it can only be used with limited types of lubricants, because some lubricants will interfere with the splicing.

It is prior art to apply a liquid silicone lubricant to the bottom surface of an endless treadmill belt. When using a liquid silicone lubricant, the lubricant is typically individually sprayed or rolled onto individual treadmill belts after the treadmill belts have been formed/made endless. According to one prior art method, an endless belt is placed on a lubricating fixture having three rollers that the belt extends around such that the "bottom" (i.e., "inner") surface of the belt engages the pulleys and the "top" (i.e., "outer") surface of the belt faces away from the pulleys. One of pulleys is driven and an applicator applies the silicone lubricant to the bottom surface as the belt travels relative to the applicator.

The liquid silicone provides adequate lubrication, but since it remains in liquid form, it has a tendency to migrate to the top surface of the belt, to any packaging materials used when shipping the belt, or to other locations where lubrication is not desired. Additionally, if too much silicone liquid is applied, belt tracking problems can result, meaning that the belt can become misaligned around the pulleys of the treadmill. If too little silicone liquid is used, belts are inadequately lubricated, which can disadvantageously increase the amount of power required to drive the belt, as well as the heat and noise generated by the belt sliding across the deck, which can negatively impact the life and operation of the belt. Finally, lubricating endless belts individually is slow and labor intensive compared with coating rolls of belting prior to forming endless belts therefrom. Typically, liquid silicone cannot be efficiently applied to rolls of belting before making numerous endless belts therefrom because the liquid silicone will interfere with bonding/adhesion that is necessary for satisfactorily splicing.

It is also prior art to apply wax to the upper surface of the deck of a treadmill. The wax can provide adequate lubrication only if a sufficient quantity is used. If too much is used, wax clings to treadmill rollers resulting in excessive noise and tracking difficulties. After a period of use, wax is typically lost from the deck such that some form of relubrication is necessary. As one example, U.S. Pat. No. 3,659,845 discloses a treadmill with a stationary support surface over which the upper run of a belt travels, and the upper surface of the support surface is formed from canvas that is impregnated with a wax, such as carnauba wax.

Whether or not a lubricant is used, the underlying construction of a treadmill belt can also affect the amount of friction resulting from the treadmill belt sliding across the deck. For example, a prior art "light-duty" treadmill belt, which is particularly well suited for use in homes, will now be described. The light-duty belt has all polyester top and bottom plies that are joined by an adhesive (e.g., polyurethane or PVC) positioned between the top and bottom plies. The top ply is a plain weave of 1000 denier multifilament polyester yarns, and the bottom ply, which includes the bottom surface that slides across the deck, is a plain weave, with both weft and warp yarns being spun polyester yarns formed from staple fibers. This "light-duty" belt is formed by cutting a section from a roll of belt material after the belt material has been lubricated as described above, so that the bottom surface of the bottom ply of the belt is impregnated with a lubricant mixture of polypropylene wax and polyurethane binder. The endless belt is formed by splicing the opposite ends of the cut section together. The splice is a "Z" splice, meaning that opposite ends of the section are cut in a zigzag pattern and then meshed together, with a PVC strip hot-pressed at the meshed area, over the top surface of the top ply.

As an additional example, a prior art "heavy-duty" treadmill belt, which is particularly well suited for use in spas, will now be described. The heavy-duty belt has all polyester top and bottom plies that are joined by an adhesive (e.g., polyurethane or PVC) positioned between the top and bottom plies. The top ply is a plain weave of 1000 denier multifilament polyester yarns. In the bottom ply of these belts, the weft yarns, which extend across the belt, are monofilament, and warp yarns, which extend in the longitudinal direction (i.e., the direction of belt travel), are 1000 denier multifilament polyester yarns (i.e., "continuous" filament yarns). Plain weaves as well as twill weaves (e.g., 3/1) are used for the bottom ply. In the twill bottom plies, the long, floating portions of the warp yarns contact the deck that the belt slides across, with the belt traveling in the longitudinal direction in which the warp yarns extend. Likewise, the belt travels in the longitudinal direction in which the warp yarns extend for the plain weaves. In these belts, the warp yarns are twisted about 130 turns/meter. For this "heavy-duty" belt, it is formed by cutting a section from a roll of belt material and forming a continuous belt via splicing the opposite ends of the section together. The splice is formed by peeling back plies at the opposite ends and then overlapping and sealing together those overlapped portions. This type of belt is typically run on a waxed deck or otherwise used in a treadmill with an automatic lubricating system that sprays lubricant onto the belt during use of the treadmill.

Although prior treadmill belts operate reasonably well, there is always a desire for new treadmill belts that provide an improved balance of properties.

BRIEF SUMMARY OF THE INVENTION

One aspect of the present invention is the provision of belt materials and/or belts that provide an improved balance of properties, and methods of making and using the belts and/or belt materials. A more specific aspect of the present invention is the provision of endless treadmill belts that are each for extending around and sliding across a treadmill deck, and that provide an improved balance of properties. Preferably the improved balance of properties results from fabric(s) of the belts and/or lubricant(s) impregnated in the belts. One aspect of the present invention is the lubricant composition(s) which are preferably, but not limited to being, impregnated in the bottom-plies of the belts.

In accordance with one aspect of the present invention, a lubricant composition is preferably impregnated in bottom surfaces of endless treadmill belts that are for sliding across the decks of treadmills. The lubricant composition is preferably a substantially uniformly dispersed mixture that includes a higher viscosity lubricant, a lower viscosity lubricant and a binder. The higher viscosity lubricant may include one or more waxes, such as one or more vegetable waxes, and most preferably the higher viscosity lubricant is carnauba wax. The lower viscosity lubricant is preferably silicone. The binder preferably includes polyurethane.

In accordance with one example of the present invention, the lubricant coating composition impregnated in an endless treadmill belt is at least substantially solid. Such solid lubricant coating compositions are preferably formed from liquid lubricant compositions that further include one or more solvents. In some of the embodiments of the present invention, the solvents are substantially entirely volatilized after the liquid lubricant composition is applied to the belt material from which endless belts are formed, and after volatilization of the solvents, the belt material is cut into lengths from which endless belts are formed.

Each of the endless treadmill belts of the present invention is preferably used in combination with a deck, so that the belt extends around and slides across the deck. The combination preferably further includes a frame to which the deck is mounted, pulleys rotatably mounted to the frame and around which the belt extends, and a motor mounted to the frame and operative for causing the belt to travel relative to the deck, so that the bottom surface of the belt slides across an upper surface of the deck. The improved balance of properties according to one aspect of the present invention pertains to there being an acceptably low coefficient of friction at the interface between the bottom surface of the belt and the upper surface of the deck.

BRIEF DESCRIPTION OF THE DRAWINGS

Figure 1:
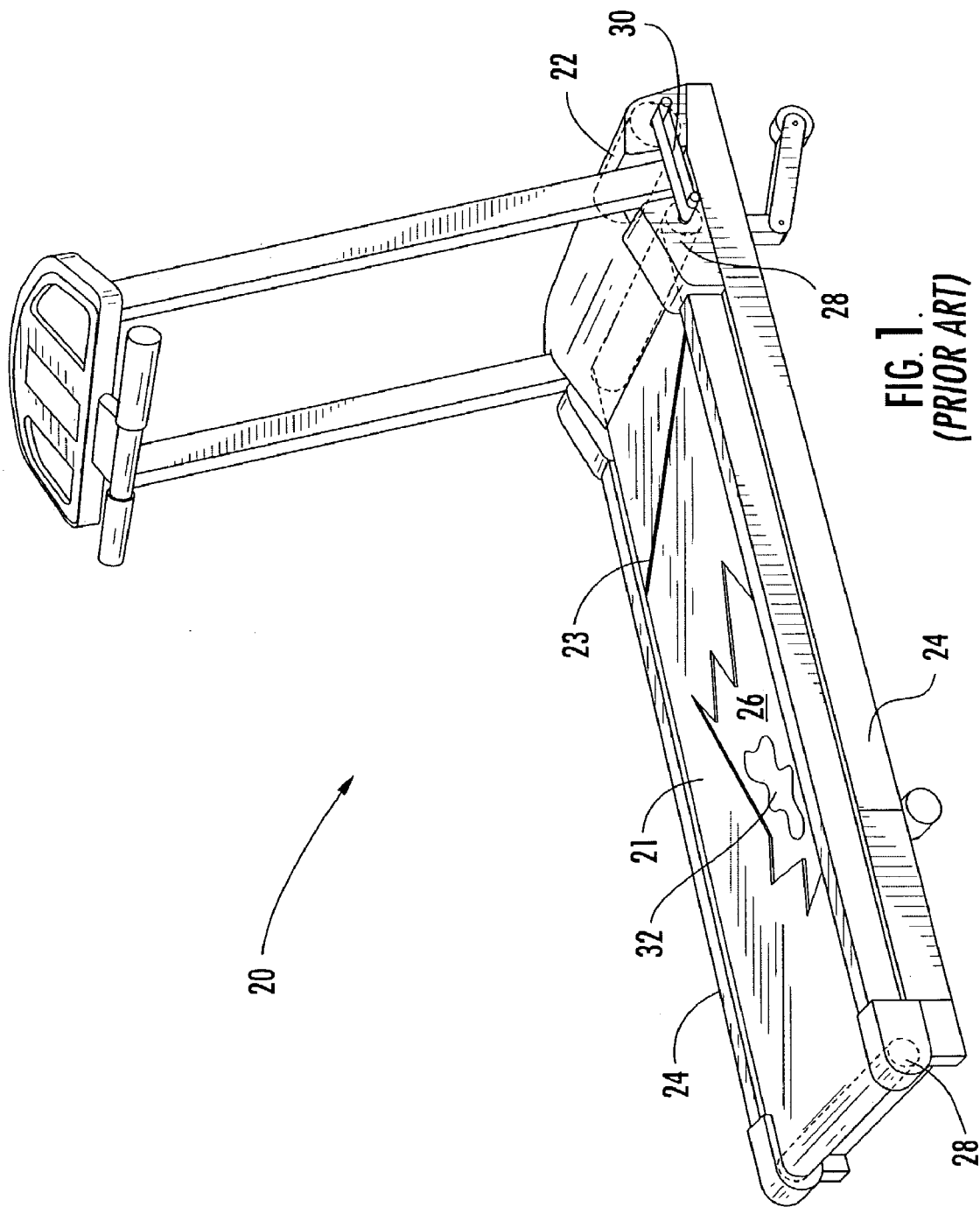
Figure 2:
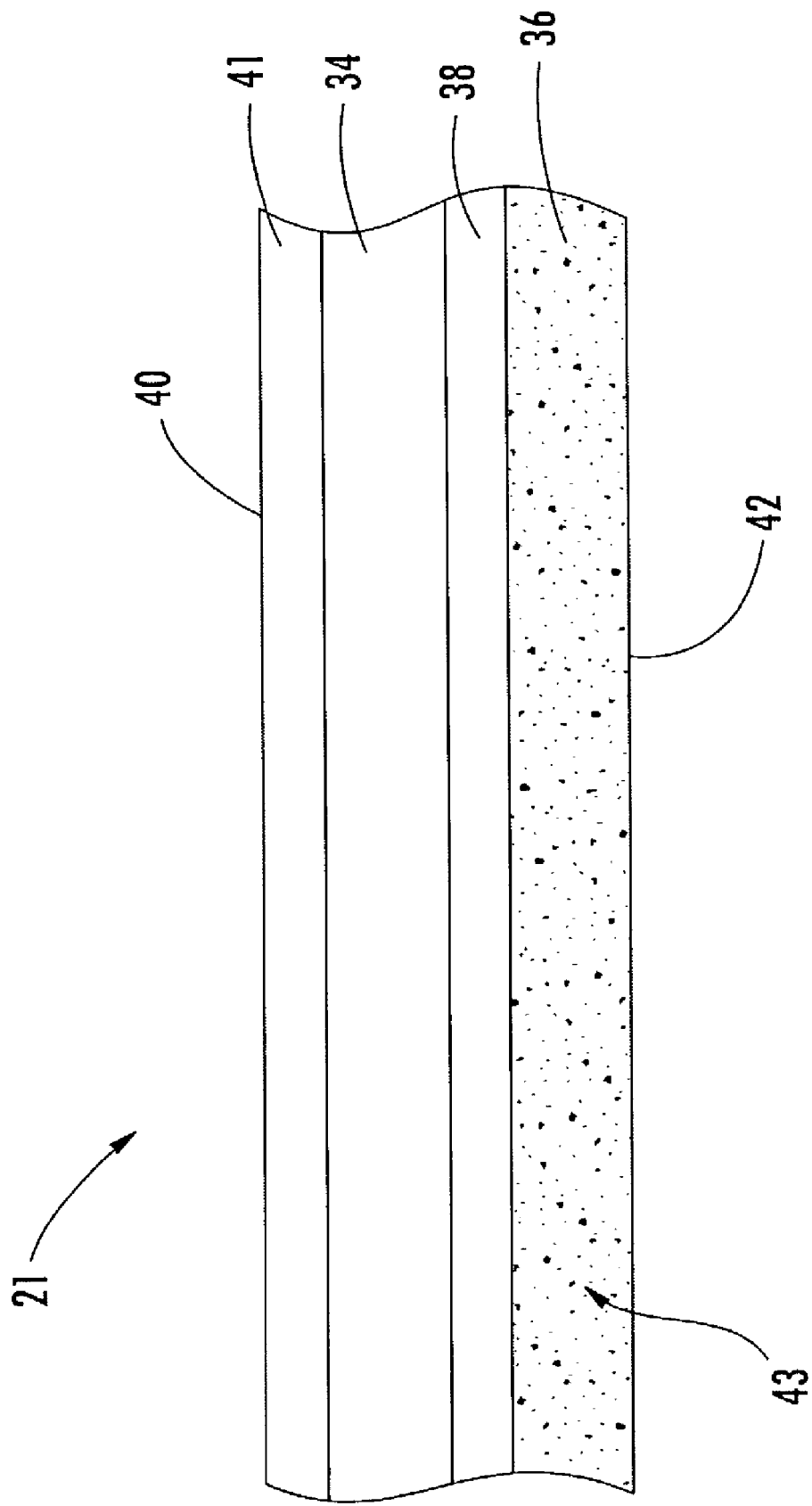
Figure 3:
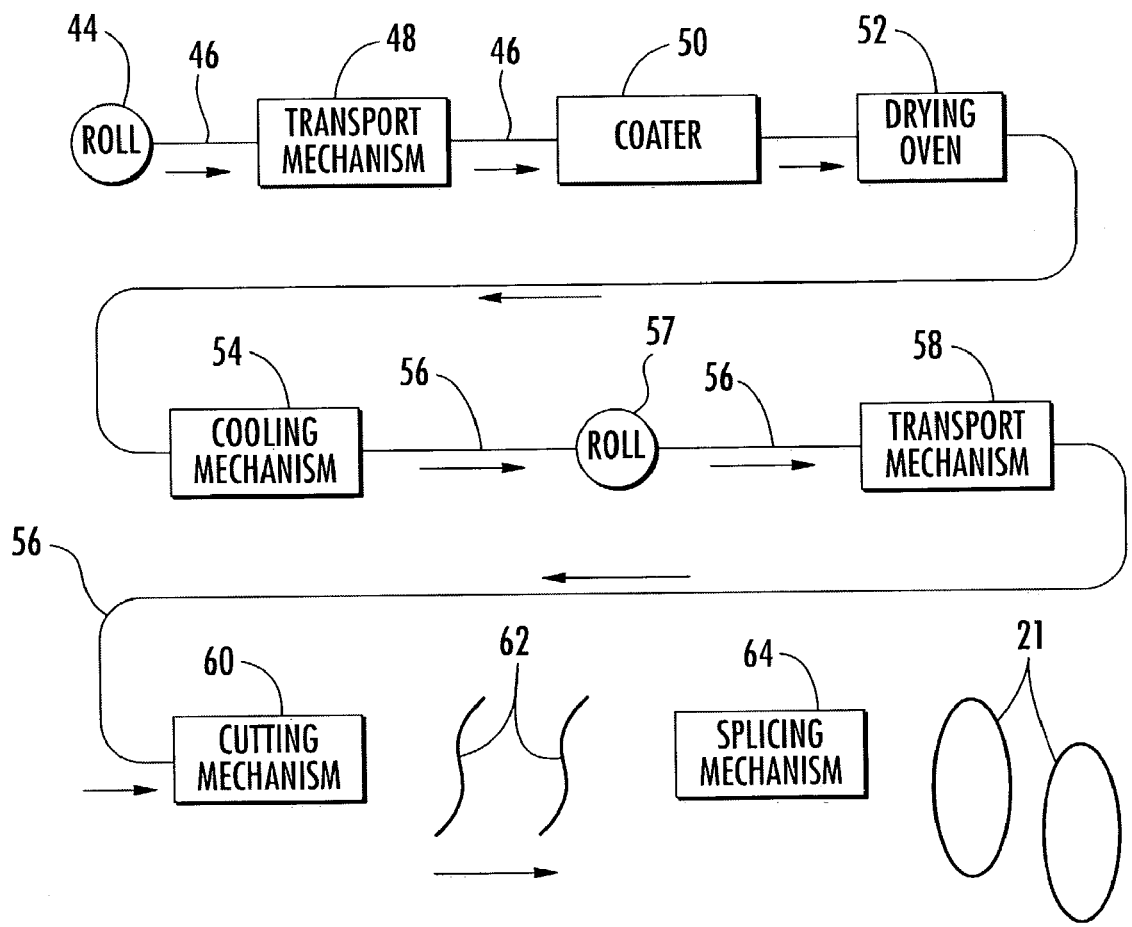
Figure 4:
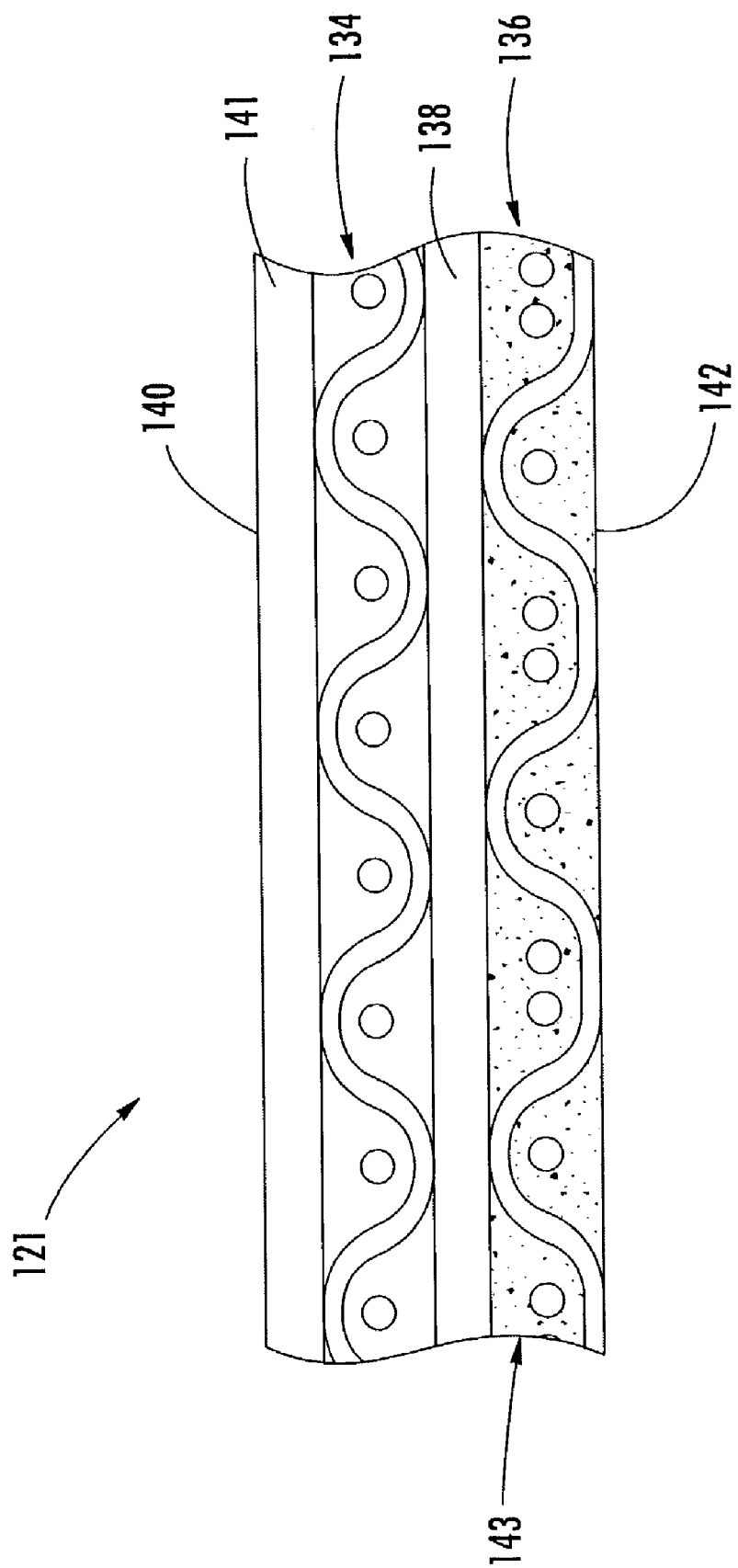

Having thus described the invention in general terms, reference will now be made to the accompanying drawings, which are not necessarily drawn to scale, and wherein:

FIG. 1 is a schematic, perspective view of portions of a prior art treadmill in accordance with a comparative embodiment, and FIG. 1 is illustrative of features of an exemplary embodiment of the present invention;

FIG. 2 is a schematic, elevational, partial view of a longitudinally extending edge of an upper run of the prior art belt of FIG. 1, in accordance with the comparative embodiment;

FIG. 3 diagrammatically illustrates prior art methods and apparatus for forming endless belts from a roll of belt material, in accordance with the comparative embodiment, and FIG. 3 is illustrative of features of the exemplary embodiment of the present invention; and FIG. 4 is a schematic, elevational, partial view of a longitudinally extending edge of an upper run of a treadmill belt, in accordance with the exemplary embodiment of the present invention.

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

A lubricated treadmill belt of an exemplary embodiment of the present invention has an improved balance of properties. Nonetheless, some features of the exemplary embodiment of the present invention are not novel per se. Accordingly, in the following, a comparative embodiment, which is prior art to the present invention, is first described with reference to FIGS. 1-3, followed by a description of the exemplary embodiment of the present invention. FIGS. 1-3 are diagrammatically/generally illustrative of some features of the exemplary embodiment of the present invention.

COMPARATIVE EMBODIMENT

FIG. 1 is a schematic, perspective view of portions of a prior art treadmill 20 in accordance with a comparative embodiment. The treadmill 20 includes an endless belt 21 that is carried by a frame and driven by a motor 22. The belt 21 is endless by virtue of opposite ends of the belt being joined together at a joint 23, which is preferably in the form of a splice. That is, the joint 23 is diagrammatically illustrative of a splice. The belt 21 is substantially uniform along its length, except for at the joint 23.

The frame includes a pair of longitudinally extending frame members 24 that are spaced apart from one another in a lateral direction. The belt 21 is partially cut away in FIG. 1, to more fully show a stationary deck 26 that is mounted to and extends laterally between medial portions of the frame members 24. Front and rear pulleys 28 are rotatably mounted to the frame members 24 and extend laterally between the frame members. The pulley 28 at the front of the frame is driven, via a drive belt 30, by the motor 22, which is mounted to the frame. The belt 21 extends around the pulleys 28 and the deck 26 so that the bottom surface of the upper run of the belt engages the pulleys and deck, and the top surface of the upper run faces away from the pulleys and deck. In use, the feet of a person using the treadmill engage the top surface of the belt 21 at a position above the deck 26, which contributes to the friction resulting from the bottom surface of the belt sliding across the upper surface of the deck. In some cases, the upper surface of the deck 26 is unwaxed, or the upper surface of the deck 26 can have wax 32 thereon, in an effort to reduce the friction.

FIG. 2 is a schematic, elevational, partial view of a longitudinally extending edge of the upper run the prior art belt 21, in accordance with the comparative embodiment. The belt 21 includes top and bottom plies 34, 36 that are each woven polyester, and the top and bottom plies are joined to one another by an intermediate ply/adhesive 38 therebetween. In use, the feet of a person using the treadmill 20 engage a top surface 40 of the belt 21 at a position above the deck 26. The top surface 40 is defined by a PVC coating 41 that is adhered to and covers the top ply 34. The bottom ply 36 includes the bottom surface 42 of the belt that slides across the upper surface of the deck 26 (FIG. 1). The belt 21 includes a lubricant coating composition 43 that is impregnated in the bottom ply 36 and is proximate the bottom surface 42. In FIG. 2, the lubricant coating composition 43 is schematically illustrated by stippling (i.e., dots and flicks) in the bottom ply 36.

FIG. 3 diagrammatically illustrates prior art methods and apparatus for forming endless belts 21 from a roll 44 of belt material 46, in accordance with the comparative embodiment. The belt material 46 is unwound from a roll 44 by one or more transport mechanisms 48 arranged along the travel path of the belt material. The belt material 46 is transported through a coater 50, such that the surface of the belt material that will eventually contact the upper surface of the deck 26 (FIG. 1) is facing upward. That is, the bottom ply of the belt material 46 is facing up. Any type of suitable coater known in the art of wide web or textile coating may be used. Exemplary coaters include knife coaters, roll coaters, and the like. In the coater 56, the belt material is preferably transported through a nip defined between an upper knife edge and a lower roller. A liquid coating composition is applied to (e.g., poured onto, or the like) the bottom ply of belt material 46 at a position just upstream from the nip, so that the liquid coating composition is impregnated into the bottom ply of the belt material as it passes through the nip.

Thereafter, the belt material 46 with the impregnated liquid coating composition is transported through a drying oven 52 using a tenter frame, or the like. The solvent component of the liquid coating composition is volatilized in the drying oven 52, resulting in an at least substantially solid lubricant coating 43 being impregnated in the bottom ply of the belt material. The dwell time for each incremental portion of the belt material within the drying oven 52 is about 1 to 5 minutes, or more specifically about 2 minutes, and the temperature within the oven is about 80° to 160° C., or more specifically about 100° C. Thereafter, the belt material is transported through a cooling mechanism 54, where the coated belt material is cooled, such as by nipping the coated belt material between chilled rollers. The coated belt material 56 is then formed into a roll 57. Thereafter, and in some cases at a different facility, the coated belt material 56 is unwound from the roll 57 by one or more transport mechanisms 58 positioned along the travel path of the coated belt material 56. At a cutting mechanism 60, sections of belt material 62 are cut from the coated belt material 56. At a splicing mechanism 64, each of the sections of belt material 62 is joined end-to-end to form an endless belt 21.

EXEMPLARY EMBODIMENT

An exemplary embodiment of the present invention is like the comparative embodiment described above, except for variations noted and variations that will be apparent to those of ordinary skill in the art. Accordingly, elements of the exemplary embodiment that at least generally correspond to elements of the comparative embodiment are respectively identified by the same reference numerals, increased by a hundred.

FIG. 4 is a schematic, elevational, partial view of a longitudinally extending edge of the upper run of the belt 121 of the exemplary embodiment of the present invention. The belt 121 includes top and bottom plies 134, 136 that are joined by an intermediate ply/adhesive 138 therebetween. The top surface 140 of the belt 121 is preferably substantially planar and is preferably defined by a coating 141, which is preferably PVC, that is adhered to and covers the top ply 134. The coating 141 is preferably embossed with an amorphous, orange-peel-like pattern. Embossing a treadmill coating with an amorphous, orange-peel-like pattern is not novel per se.

The bottom ply 136 includes a bottom surface 142 that slides across the upper surface of the deck 26 (FIG. 1). Between the pulleys 28 (FIG. 1), the bottom surface 142 is preferably substantially planar, except for the texture of the fabric of the bottom ply 136 and any discontinuity in the region of the splice 23 (FIG. 1). The exemplary embodiment of the present invention is not limited to the type of deck 26 or type of treadmill 20 illustrated and described with reference to FIG. 1, because the belt 121 of the exemplary embodiment of the present invention operates advantageously with a wide range of different types of decks and treadmills, and with a wide variety of other types of conveyor structures.

In accordance with the exemplary embodiment of the present invention, the belt 121 is preferably formed by splicing together opposite ends of a section of belt material. Preferably, the splice (e.g., see splice 23 in FIG. 1) extends at an oblique angle relative to the longitudinally extending edges of the endless belt 121, and the belt 121 is preferably substantially uniform along its length, except for in the region of the splice. The splice is preferably a "Z" splice, meaning that opposite ends of the section are cut in a zigzag pattern and then meshed together, with a PVC strip hot-pressed at the meshed area, over the top surface of the top ply 134.

As noted above, the belt 121 preferably includes three main layers: a top ply 134, an intermediate ply/adhesive 138 and a bottom ply 136. In accordance with the exemplary embodiment illustrated in FIG. 4, the top ply 134 is preferably a plainly woven fabric. The top ply 134 may be formed of any woven fabric exhibiting sufficient durability and flexibility, such as a woven fabric formed from polyester yarns, particularly multifilament polyester yarns having a denier of about 1000. As used herein, the term "yarn" refers to any continuous strand of textile fibers, filaments or material in a form suitable for knitting, weaving, or otherwise intertwining to form a textile fabric. In accordance with the exemplary embodiment of the present invention, it is preferred for all of the fabrics of the belt 121 to be constructed solely of man-made filaments/fibers, although natural fibers may be used in alternative embodiments.

The intermediate ply/adhesive 138 is preferably formed from an elastomeric material. In accordance with the exemplary embodiment of the present invention, the intermediate ply/adhesive 138 is formed from a cured elastomeric material, such as a cured polyurethane.

The bottom ply 136 may be formed from any fabric providing sufficient strength, durability and frictional properties to the resulting belt construction. In accordance with the exemplary embodiment of the present invention, the fabric of the bottom ply 136 is preferably lofty. Although not wishing to be bound by theory, it is believed that the incorporation of a bottom ply 136 exhibiting sufficient loftiness/bulkiness reduces the noise resulting from friction between the bottom surface 142 and the deck 26 (FIG. 1) while the treadmill is in operation.

In accordance with the exemplary embodiment of the present invention, the bottom ply 136 is formed from a lofty woven fabric that includes an effective amount of textured synthetic yarns in at least the warp direction. As used herein, the term "textured" yarn refers to yarns having increased bulk in comparison to comparable yarns which have not been subjected to a texturizing process. Hence the terms "bulky" and "textured" are used interchangeably throughout the remainder of the application. Textured yarns are generally characterized by the presence of crimps or random loops down the length of the yarn. Advantageously the bottom ply 136 includes textured synthetic continuous filament yarns in the warp and/or weft direction, particularly continuous multifilament yarns. In accordance with the exemplary embodiment of the present invention, at least a portion of the warp and/or weft yarns within the bottom ply 136 are formed from textured polyester continuous filament yarns, and preferably all of the yarns of the bottom ply are textured polyester continuous filament yarns.

As known in the art, bulk and/or crimp may be imparted to continuous filament yarns by a variety of texturing processes, including false twist texturing, air entangling and the like. In accordance with the exemplary embodiment of the present invention, a preferred lofty/bulky fabric for use in the bottom ply 136 is continuous filament polyester fabric Style No. 930392 available from Milliken & Company of Spartanburg, S.C.

In accordance with alternative embodiments of the present invention, yarns formed from staple fibers, such as synthetic staple fibers, are used either in conjunction with or in lieu of the bulky continuous filament yarns described above. For example, the bottom ply 136 may be formed entirely from synthetic staple filament yarns. Alternatively, the bottom ply 136 may include a mixture of yarns formed from staple and textured continuous filaments. In such alternative embodiments, the synthetic staple yarn is preferably formed from polyester.

In accordance with the exemplary embodiment of the present invention, the bottom ply 136 is preferably formed from a twill weave. Alternatively, the bottom ply 136 may be formed from a plain weave. More specifically, preferred fabric specifications of the bottom ply 136, in accordance the exemplary embodiment of the present invention, are provided below:

the fabric of the bottom ply 136 is a twill weave, preferably a 2/1 twill weave, meaning that where the bottom surface 142 of the upper run engages the deck 26 (FIG. 1), for each warp yarn, the warp yarn passes under two weft yarns for every weft yarn it passes over, so that the long, floating portions of the warp yarns contact the upper surface of the deck 26 that the belt slides across, with the belt traveling in the direction in which the warp yarns extend;

the weft and warp yarns of the fabric of the bottom ply 136 are about 300 denier yarns; and the fabric of the bottom ply 136 has about 73×40 yarns per inch (i.e., 73 warp ends per inch in the lateral direction, and 40 weft ends per inch in the longitudinal direction).

Belts 121 formed in accordance with the exemplary embodiment of the present invention preferably exhibit an elasticity differential between the plies. More particularly, the fabric of the bottom ply 136 can be stretched more easily than the fabric of the top ply 134, and the fabric of the bottom ply 136 has a greater range of elasticity than the fabric of the top ply 134. In theory, the textured nature of the bottom ply 136 provides a relatively higher stretchability and relatively larger range of elasticity. That is, and very generally described, the bottom ply 136 exhibits relatively greater "springiness" in the longitudinal direction than the top ply 134, and the top ply 134 exhibits relatively greater "stiffness" in the longitudinal direction than the bottom ply 136. More specifically, the bottom ply 136 has a lower modulus of elasticity than the top ply 134, in the longitudinal direction. Advantageously, the relatively greater "stiffness" of the top ply 134 compensates for the relatively greater "springiness" of the bottom ply 136, so that the resulting belt 121 is not too "springy" in the longitudinal direction.

As mentioned above, the bulkiness of at least the warp yarns in the bottom ply 136 is believed to reduce noise associated with the friction between the bottom surface 142 of the belt 121 and the deck 26 (FIG. 1). In accordance with the exemplary embodiment of the present invention, the coefficient of friction between the bottom surface 142 of the belt 121 and the deck 26 is preferably reduced by an at least substantially solid lubricant composition 143 that is impregnated in the fabric of the bottom ply 136 and is proximate the bottom surface 142. As used herein, the term "solid" means that the solvents employed within the corresponding liquid lubricant composition, from which the solid lubricant composition 143 has been formed, have been substantially removed, such as by volatization and the like. The solid lubricant composition 143 is preferably a mixture, and most preferably is a substantially uniformly dispersed mixture. In FIG. 4, the solid lubricant composition 143 is schematically illustrated by stippling (i.e., dots and flicks) in the bottom ply 136.

In accordance with the exemplary embodiment of the present invention, the solid lubricant composition 143 preferably includes one or more higher viscosity lubricants, one or more lower viscosity lubricants, and one or more binders, with the lower viscosity lubricant(s) having lower viscosity than the higher viscosity lubricant(s). Exemplary higher viscosity lubricants preferably include waxes, such as natural and synthetic waxes. Natural waxes include waxes derived from animal, vegetable and mineral sources, as well as mixtures thereof. In accordance with the exemplary embodiment of the present invention, the higher viscosity lubricant is a vegetable wax, such as carnauba wax, candelilla wax, bay berry wax, sugar cane wax and mixtures thereof. Most preferably the vegetable wax is carnauba wax.

The solid lubricant composition 143 preferably includes no more than about 60 weight percent of the higher viscosity lubricant, based on the weight of the solid lubricant composition ("bosc"). More specifically, the solid lubricant composition 143 preferably includes from about 30 weight percent to about 60 weight percent higher viscosity lubricant, bosc. Even more specifically, in accordance with the exemplary embodiment of the present invention, the solid lubricant composition 143 includes about 55 weight percent of the higher viscosity lubricant, bosc. In alternative embodiments, the solid lubricant composition includes about 52 weight percent of the higher viscosity lubricant, bosc.

Suitable lower viscosity lubricants include silicones, mineral oils, polyglycols, and mixtures thereof. In accordance with the exemplary embodiment of the present invention, the lower viscosity lubricant includes one or more silicone lubricants. In accordance with the exemplary embodiment of the present invention, the silicone lubricant is a polysiloxane, particularly a polydimethylsiloxane. One exemplary silicone lubricant is Dow Corning 200 Fluid, commercially available from the Dow Corning Corporation of Midland Mich.

The lower viscosity lubricant can be included in any amount providing sufficient lubricity without detrimentally impacting the cohesion of the resulting solid lubricant composition 143. Lower viscosity lubricants preferably exhibit a lower coefficient of friction than higher viscosity lubricants. However, lower viscosity lubricants can impact coating cohesion/adhesive properties. Consequently, the solid lubricant composition 143 preferably includes significantly higher amounts of the higher viscosity lubricant than the lower viscosity lubricant. For example, the weight ratio of the higher viscosity lubricant to lower viscosity lubricant may be 2:1 or higher. Advantageously, the weight ratio of the higher viscosity lubricant to lower viscosity lubricant may be 3:1 or higher, such as a ratio of about 3.33:1.

Accordingly, the solid lubricant composition 143 preferably includes no more than about 30 weight percent of the lower viscosity lubricant, bosc. More specifically, the solid lubricant composition 143 preferably includes from about 10 weight percent to about 30 weight percent of the lower viscosity lubricant, bosc. Even more specifically, in accordance with the exemplary embodiment of the present invention, the solid lubricant composition 143 includes about 16 weight percent of the lower viscosity lubricant, bosc. In alternative embodiments of the present invention, the solid lubricant composition 143 includes about 15 weight percent of the lower viscosity lubricant, bosc.

The binder within the solid lubricant composition 143 serves as an adhesive agent to provide bonding in the bottom ply 136. Consequently, exemplary binders for use in the present invention include any film forming polymer known in the art that is compatible with the remaining components within the solid lubricant composition 143 and provides sufficient bonding properties and flexibility. Suitable binders include polyurethanes, acrylic polymers, vinyl polymers, and the like, including mixtures and copolymers thereof. In accordance with the exemplary embodiment of the present invention, the binder is preferably polyurethane. Suitable polyurethanes include both polyester polyurethanes and polyether polyurethanes. In accordance with the exemplary embodiment of the present invention, the polyurethane is a polyester polyurethane. One suitable commercially available polyester polyurethane is ESTANE™ 5712 F30 polyurethane from Noveon, Inc. of Cleveland, Ohio.

The binder may be present in the solid lubricant composition in any amount effective to provide sufficient bonding in the bottom ply 136. For example, the binder may be present in the solid lubricant composition 143 in an amount ranging from about 10 to 50 weight percent, bosc. Preferably, the solid lubricant composition 143 includes about 20 weight percent to about 30 weight percent binder, bosc. More preferably, the solid lubricant composition 143 includes from about 25 weight percent to about 30 weight percent binder, bosc, such as an amount of about 29 weight percent or about 28 weight percent.

In accordance with the exemplary embodiment of the present invention, the solid lubricant composition may further include one or more bonding agents, e.g. crosslinkers, to crosslink the binder and further promote cohesion within the solid lubricant composition 143 and adhesion in the bottom ply 136. Any suitable crosslinker known in the art for use in conjunction with a given binder may be employed. Exemplary crosslinkers include isocyantes, such as polyisocyanates and diisocyantes, peroxides, epoxies, polyfunctional amides and mixtures thereof. In accordance with the exemplary embodiment of the present invention, a polyisocyanate crosslinking agent may be included in solid lubricant compositions employing a polyurethane binder.

The crosslinker is included in the composition in amounts effective to provide a sufficient amount of crosslinking within the binder without imparting excessive stiffness to the resulting solid lubricant composition 143. Preferably, the crosslinker is present in the solid lubricant composition in amounts ranging from about 2.5 to 10 weight percent, bosc. In accordance with the exemplary embodiment of the present invention, the crosslinker is preferably present in an amount of about 4.9 weight percent, bosc.

In accordance with the exemplary embodiment of the present invention, the solid lubricant composition is formed from a liquid lubricant composition that is applied to, e.g. coated onto, the bottom ply as a liquid lubricant composition. The solvents are then removed from the liquid lubricant composition, typically by drying and the like, preferably resulting in a layer of the solid lubricant composition 143 substantially covering at least a portion of the outermost surface of, and substantially impregnated into, the fabric of the bottom ply 136.

The liquid lubricant composition may be formed by dispersing or dissolving appropriate amounts of the higher viscosity lubricant, the lower viscosity lubricant and a binder composition in a lubricant solvent. The higher viscosity lubricant and lower viscosity lubricant are normally incorporated into the liquid lubricant composition in an undiluted form. The binder composition preferably contains the binder polymer dispersed or dissolved in an appropriate binder solvent. Suitable binder solvents include polar organic solvents, such as acetone and methyl ethyl ketone ("MEK") and mixtures thereof. In accordance with the exemplary embodiment of the present invention, the binder solvent is a mixture of acetone and MEK, particularly a mixture containing about 58 parts acetone per about 42 parts MEK.

The lubricant solvent may be any organic solvent capable of dispersing the higher and lower viscosity lubricants and binder composition. The lubricant solvent is preferably a ketone based solvent, such as cyclohexanone.

The liquid lubricant composition is preferably formed by initially combining the higher and lower viscosity lubricants with the lubricant solvent and heating the initial mixture to an elevated temperature, such as a temperature of about 80° C. while the initial mixture is under low speed agitation. Upon dissolution of the higher viscosity lubricant, the initial mixture may be allowed to cool to a lower, yet elevated, temperature, such as a temperature of about 55° C. Upon cooling to the lower temperature, the binder composition may be added, after which the agitation speed may be increased and the liquid lubricant composition may be agitated for a period of about 5 minutes. The liquid lubricant composition is typically allowed to sit for at least 24 hours, after which the liquid lubricant composition is stirred and the viscosity is adjusted with an appropriate organic solvent, such as acetone. The viscosity of the liquid lubricant composition is preferably about 2500 cps (Brookfield viscosity based on a 50 rpm spindle speed).

In the embodiments of the present invention which further include a crosslinking agent, a bonding agent composition may be added to the liquid lubricant composition. The bonding agent composition preferably includes the crosslinker dissolved or suspended in an appropriate organic solvent. For example, the bonding agent composition may include a polyisocyante crosslinking agent dissolved or suspended within ethyl acetate. One exemplary bonding agent composition is DESMODUR RC, commercially available from Bayer Corporation of Pittsburgh, Pa., which contains about 30% polyisocyanate in ethyl acetate. The bonding agent composition is preferably added to the liquid lubricating composition at room temperature under high speed agitation. The resulting liquid lubricant composition is allowed to agitate at least about 3 minutes prior to use. As known in the art, the shelf life of compositions containing bonding agents may be limited. Accordingly, the bonding agent composition may be added to the liquid lubricant composition either immediately prior to or a few hours before its application to the fabric of the bottom ply 136.

The liquid lubricant composition is preferably applied to the belt material using the equipment and processes described in conjunction with the comparative embodiment described above. More particularly, a coater, such as a knife coater, is used to apply the liquid lubricant composition to the bottom ply of the belt material and the coated belt material is subsequently dried. In accordance with the exemplary embodiment of the present invention, the various solvents within the liquid lubricant composition are volatilized in the drying oven 52 (FIG. 3) following the coating process, so that the resulting solid lubricant composition 143 is impregnated in the fabric of the bottom ply 136. The solid lubricant composition 143 is preferably at least substantially in solid form at room temperature (e.g., 72° F.). The coated belt 121 preferably has solid lubricant composition coat weight ranging from about 1 oz/sq. yd to about 5 oz/sq. yd. Most preferably, the solid lubricant composition 143 is present in the belt 121 in an amount of about 2.5 oz/sq. yd.

The endless belts 121 of the exemplary embodiment of the present invention are preferably used in treadmills; nonetheless, the belts 121 can also be used in a wide range of other applications in which belts are used. In one example, the endless belt 121 is used in a treadmill with an unwaxed deck (e.g., see the deck 26 in FIG. 1). In another example, the belt 121 is used in a treadmill with a waxed deck (e.g., see the wax 32 on the deck 26 in FIG. 1), but advantageously the quantity of wax on the deck can be substantially reduced as compared to the prior art. Since the lubricated belts 121 are used with unwaxed decks, or decks with substantially reduced wax quantity, wax will not substantially accumulate on rollers of the treadmills.

Numerous other advantages are associated with the belts 121 of the exemplary embodiment of the present invention. For example, since the belt lubricant 143 of the exemplary embodiment is at least substantially solid after drying, migration of the lubricant 143 is substantially precluded. Also, due to the solid nature of the lubricant 143, it can advantageously be applied to rolls of belting material before sections are cut therefrom and spliced, because the solid lubricant does not substantially interfere with the splicing/adhesion. Additionally, the fabric of the bottom ply 136 is preferably saturated with the lubricant composition 143, with the lubricant composition intimately impregnated in the fabric bottom ply, and not just on the bottom surface, so that any loss of lubricant from the belt is insubstantial. Preferably, the binder/bonding agent in the lubricant composition 143 substantially keeps the lubricant(s) on the belt 121 so that relubrication is not necessary. The small proportion of silicone lubricant in the lubricant composition 143 improves lubrication, but the proportion is sufficiently small so that the lubricant composition 143 is still substantially solid at room temperature. Advantageously, the small proportion of silicone lubricant does not substantially migrate or substantially interfere with belt splicing.

Many modifications and other embodiments of the inventions set forth herein will come to mind to one skilled in the art to which these inventions pertain having the benefit of the teachings presented in the foregoing descriptions and the associated drawings. For example, the lubricant compositions of the present invention can be applied to many different types of belts, can be used on items other than belts, and can be considered to be isolated articles of manufacture (e.g., separate from any belts, treadmills, etc.) For example, it is within the scope of the present invention for the lubricant 143 of the present invention to be used with (e.g. applied to and preferably impregnated into the bottom surfaces of) conventional treadmill belts. Likewise, the belts of the present invention can be used in combination with many different types of lubricants or can be considered to be isolated articles of manufacture (e.g., separate from any lubricant etc.).

It is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A belt for extending in a longitudinal direction and traveling relative to a deck, the belt comprising:
    a fabric that at least partially forms a bottom surface of the belt and is for sliding across the deck; and
    an at least substantially solid lubricant composition impregnated substantially throughout the thickness of the fabric and at least partially forming the bottom surface of the belt, wherein the lubricant composition includes at least one higher viscosity lubricant and at least one lower viscosity lubricant, with the higher viscosity lubricant having a higher viscosity than the lower viscosity lubricant, and the lubricant composition being a substantially uniformly dispersed mixture.

2. A belt according to claim 1, wherein the higher viscosity lubricant includes carnauba wax and the lower viscosity lubricant includes silicone lubricant.

3. A belt according to claim 2, wherein the lubricant composition further includes at least one binder.

4. A belt according to claim 1, wherein the higher viscosity lubricant includes a wax.

5. A belt according to claim 4, wherein the wax is selected from the group of animal, vegetable and mineral waxes.

6. A belt according to claim 1, wherein the higher viscosity lubricant includes carnauba wax.

7. A belt according to claim 1, wherein the higher viscosity lubricant is present in the lubricant composition in an amount ranging from about 30 weight percent to about 60 weight percent.

8. A belt according to claim 1, wherein the lower viscosity lubricant is selected from the group of silicones, mineral oils, polyglycols and mixtures thereof.

9. A belt according to claim 1, wherein the lower viscosity lubricant includes silicone lubricant.

10. A belt according to claim 1, wherein the lower viscosity lubricant is present in the lubricant composition in an amount ranging about 10 weight percent to about 30 weight percent.

11. A belt according to claim 1, wherein the lubricant composition further includes at least one binder.

12. A belt according to claim 11, wherein the binder is selected from the group of polyurethanes, acrylic polymers, vinyl polymers and mixtures and copolymers thereof.

13. A belt according to claim 11, wherein the binder is polyurethane.

14. A belt according to claim 11, wherein the binder is present in the lubricant composition in an amount ranging from about 10 weight percent to about 50 weight percent.

15. A belt for extending in a longitudinal direction and traveling relative to a deck, the belt comprising:
    a fabric that at least partially forms a bottom surface of the belt and is for sliding across the deck; and
    an at least substantially solid lubricant composition impregnated in the fabric and at least partially forming the bottom surface of the belt,
    wherein the lubricant composition includes at least one higher viscosity lubricant, at least one lower viscosity lubricant, with the higher viscosity lubricant having a higher viscosity than the lower viscosity lubricant, at least one binder, and at least one bonding agent, and the lubricant composition being a substantially uniformly dispersed mixture.

16. A belt according to claim 15, wherein the bonding agent is selected from the group of polyisocyanates, diisocyantes, peroxides, epoxies, polyfunctional amides and mixtures thereof.

17. A belt according to claim 15, wherein the bonding agent is polyisocyanate.

18. A belt according to claim 15, wherein the bonding agent is present in the lubricant composition in an amount ranging from about 2.5 to 10.0 weight percent.

19. A belt for extending in a longitudinal direction and traveling relative to a deck, the belt comprising:

a fabric that at least partially forms a bottom surface of the belt and is for sliding across the deck; and an at least substantially solid lubricant composition impregnated substantially throughout the thickness of the fabric and at least partially forming the bottom surface of the belt, wherein the lubricant composition includes a binder and silicone lubricant, and the lubricant composition is a substantially uniformly dispersed mixture.

20. A belt according to claim 19, wherein the lubricant composition further includes at least one higher viscosity lubricant which has a higher viscosity than the silicone lubricant.

21. A belt according to claim 20, wherein the higher viscosity lubricant is carnauba wax.

22. A belt according to claim 19, wherein the binder is selected from the group of polyurethanes, acrylic polymers, vinyl polymers and mixtures and copolymers thereof.

23. A belt according to claim 19, wherein the binder is polyurethane.

24. A belt for extending in a longitudinal direction and traveling relative to a deck, the belt comprising:

a fabric that at least partially forms a bottom surface of the belt and is for sliding across the deck; and an at least substantially solid lubricant composition impregnated in the fabric and at least partially forming the bottom surface of the belt, wherein the lubricant composition includes a binder, a silicone lubricant, and at least one bonding agent, and the lubricant composition is a substantially uniformly dispersed mixture.

25. A belt according to claim 24, wherein the bonding agent is selected from the group of polyisocyanates, diisocyantes, peroxides, epoxies, polyfunctional amides and mixtures thereof.

26. A belt according to claim 24, wherein the bonding agent is polyisocyanate.

* * * * *